US012684388B2

(12) United States Patent
Shao et al.

(10) Patent No.: US 12,684,388 B2
(45) Date of Patent: Jul. 14, 2026

(54) SYSTEMS AND METHODS FOR ENHANCING CHANNEL MEASUREMENT AND BEAM MANAGEMENT

(71) Applicant: ZTE CORPORATION, Shenzhen (CN)

(72) Inventors: Shijia Shao, Shenzhen (CN); Bo Gao, Shenzhen (CN); Zhen He, Shenzhen (CN); Ke Yao, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 316 days.

(21) Appl. No.: 18/148,236

(22) Filed: Dec. 29, 2022

(65) Prior Publication Data

US 2023/0217284 A1    Jul. 6, 2023

Related U.S. Application Data

(63) Continuation of application No. PCT/CN2021/084348, filed on Mar. 31, 2021.

(51) Int. Cl.
*H04B 17/20* (2015.01)
*H04B 17/24* (2015.01)
(Continued)

(52) U.S. Cl.
CPC ............ *H04W 24/10* (2013.01); *H04B 17/24* (2015.01); *H04B 17/25* (2023.05); *H04W 24/08* (2013.01);
(Continued)

(58) Field of Classification Search
CPC .. H04B 7/02–12; H04B 17/0082–3913; H04L 5/0001–0098; H04W 8/22–245;
(Continued)

(56) References Cited

U.S. PATENT DOCUMENTS

2020/0267584 A1    8/2020  Kim et al.
2021/0211176 A1*   7/2021  Gao ...................... H04W 24/10
(Continued)

FOREIGN PATENT DOCUMENTS

CN          109803418 A      5/2019
CN          111818546 A      10/2020
(Continued)

OTHER PUBLICATIONS

International Search Report and Written Opinion for PCT Appl. No. PCT/CN2021/084348, mailed Dec. 30, 2021 (9 pages).
(Continued)

*Primary Examiner* — Timothy J Weidner
(74) *Attorney, Agent, or Firm* — Foley & Lardner LLP

(57) ABSTRACT

Presented are systems and methods for channel measurement and beam management. A wireless communication device may receive a configuration from a wireless communication node, the configuration including at least one channel measurement reference signal (RS) resource (CMR). The wireless communication device may perform, according to the configuration, measurement of the at least one CMR. The wireless communication device may send a report to the wireless communication node. The report may include at least one of: a CMR index, or a channel quality.

16 Claims, 20 Drawing Sheets

2050

(51) Int. Cl.

| | |
|---|---|
| *H04W 24/08* | (2009.01) |
| *H04W 24/10* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.

CPC ............ *H04W 84/02* (2013.01); *H04W 88/02* (2013.01); *H04W 88/08* (2013.01); *H04W 92/02* (2013.01); *H04W 92/10* (2013.01)

(58) Field of Classification Search

CPC ..... H04W 24/02–10; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2023/0061722 | A1* | 3/2023 | Hao | H04W 24/10 |
| 2024/0154667 | A1* | 5/2024 | Matsumura | H04W 24/10 |

FOREIGN PATENT DOCUMENTS

| | | | | |
|---|---|---|---|---|
| CN | 112312455 A | 2/2021 | | |
| WO | WO-2020034312 A1 * | 2/2020 | ............ | H04W 24/10 |

OTHER PUBLICATIONS

ZTE, "Enhancements on multi-beam operation" 3GPP TSG RAN WG1 Meeting #96bis, R1-1904014, Apr. 12, 2019, Xi'an, China (17 pages).

ZTE, "Enhancements on Multi-beam operation," 3GPP TSG RAN WG1 Meeting #97, R1-1906237, May 17, 2019, Reno, USA (18 pages).

Extended European Search Report on EP 21933727.6 dated Jul. 11, 2023 (9 pages).

VIVO, "Further discussion and evaluation on MTRP CSI and partial reciprocity," 3GPP TSG RAN WG1 #104-e; R1-2007650; Jan. 25-Feb. 5, 2021; e-Meeting (28 pages).

ZTE, "CSI enhancements for Multi-TRP and FR1 FDD reciprocity," 3GPP TSG RAN WG1 #104-e; R1-2100291; Jan. 25-Feb. 5, 2021; e-Meeting (15 pages).

Ad-Hoc Chair (Samsung), "Session notes for 8.1 (Further enhancements on MIMO for NR)", 3GPP TSG RAN WG1 Meeting #104-e, R1-2102191, Feb. 5, 2021, e-Meeting (20 pages).

Ad-Hoc Chair (Samsung), "Session notes for 8.1 (Further enhancements on MIMO for NR)", 3GPP TSG RAN WG1 Meeting #104-e, R1-2102250, Feb. 5, 2021, e-Meeting (20 pages).

Huawei et al., "CSI Enhancements for Rel-17", 3GPP TSG RAN WG1 Meeting #104-e, R1-2100214, Feb. 5, 2021, e-Meeting (12 pages).

Intel Corporation, "On CSI enhancements for MTRP and FDD", 3GPP TSG RAN WG1 104-e, R1-2100642, Feb. 5, 2021, e-Meeting (12 pages).

LG Electronics, "CSI enhancements for Rel-17", 3GPP TSG RAN WG1 #104-e, R1-2000624, Feb. 5, 2021, e-Meeting (7 pages).

LG Electronics, "Enhancements on beam management for multi-TRP", 3GPP TSG RAN WG1 #104-e, R1-2100621, Feb. 5, 2021 (9 pages).

Moderator (CATT), "Moderator summary on M-TRP simultaneous transmission with multiple Rx panels (round 0)", 3GPP TSG RAN WG1 Meeting #104-e, R1-2101862, Feb. 5, 2021, e-Meeting (39 pages).

Moderator Huawei et al., "Summary of CSI enhancements for MTRP and FDD (Round 3)", 3GPP TSG RAN WG1 Meeting #104-e, R1-2102061, Feb. 5, 2021, E-Meeting (33 pages).

Moderator Huawei et al., "Summary of CSI enhancements for MTRP and FDD (Round 4)", 3GPP TSG RAN WG1 Meeting #104-e, R1-2102062, Feb. 5, 2021, e-Meeting (29 pages).

Nokia et al., "Enhancement on CSI measurement and reporting", GPP TSG RAN WG1 Meeting #104-e, R1-2101011, Feb. 5, 2021, e-Meeting (21 pages).

OPPO, "CSI enhancements: MTRP and FR1 FDD reciprocity", 3GPP TSG RAN WG1 #104e, R1-2100124, Feb. 5, 2021, e-Meeting (12 pages).

Qualcomm Incorporated, "CSI enhancements: MTRP and FR1 FDD reciprocity", 3GPP TSG RAN WG1 #104-e, R1-2101452, Feb. 8, 2021, e-Meeting (14 pages).

VIVO, "Further discussion and evaluation on MTRP CSI and partial reciprocity", 3GPP TSG RAN WG1 #104-e, R1-2007650, Feb. 5, 2021, e-Meeting (28 pages).

5G; NR; "Radio Resource Control (RRC); Protocol specification (3GPP TS 38.331 version 16.3.1 Release 16)", ETSI TS 138 331 V16.3.1, Jan. 2021, (916 pages).

Communication pursuant to Article 94(3) EPC for EP Appl. No. 21933727.6, dated Jun. 3, 2025 (11 pages).

First Office Action for CN Appl. No. 202310504002.3, dated Aug. 28, 2025 (with English translation, 21 pages).

Office Action for ID Appl. No. P00202215880, dated Sep. 4, 2025 (with English translation, 6 pages).

* cited by examiner

300

400

| Group 0 | | Group 1 | | |
|---|---|---|---|---|
| CMR 1 | CMR 2 | CMR 3 | CMR 4 | CMR 5 |
| 1 | 0 | 1 | 1 | 0 |
| 1 | 1 | 0 | 1 | 1 |

| | | Group 1 | | | Group 0 | |
|---|---|---|---|---|---|---|
| | | CMR 3 | CMR 4 | CMR 5 | CMR 1 | CMR 2 |
| Group 0 | CMR 1 | 1 | 1 | 0 | 0 | 1 |
| | CMR 2 | 0 | 1 | 1 | 0 | 0 |

| Group 1 | | | Group 0 |
|---|---|---|---|
| CMR 3 | CMR 4 | CMR 5 | CMR 1 |
| 1 | 1 | 0 | |
| 0 | 1 | 1 | CMR 2 |

| Group 0 | | Group 1 | | |
|---|---|---|---|---|
| CMR 1 | CMR 2 | CMR 3 | CMR 4 | CMR 5 |
| 1 | 0 | 1 | 1 | 0 |

| Report group 1 | CRI/SSBRI - 1 | RSRP/SINR - 1 | RI -1 |
| | CRI/SSBRI - 2 | RSRP/SINR - 2 | RI-2 |
| | CRI/SSBRI - 3 | RSRP/SINR - 3 | RI-3 |
| Report group 2 | CRI/SSBRI - 4 | RSRP/SINR - 4 | RI-4 |

| Report group 1 | CRI/SSBRI - 1 | RSRP/SINR - 1 | RI - 1 |
| | CRI/SSBRI - 2 | RSRP/SINR - 2 | |
| Report group 2 | CRI/SSBRI - 3 | RSRP/SINR - 3 | RI-2 |
| | CRI/SSBRI - 4 | RSRP/SINR - 4 | |

| | CRI/SSBRI - 1 | RSRP/SINR - 1 | Flag - 1 |
| Report group 1 | CRI/SSBRI - 2 | RSRP/SINR - 2 | Flag - 2 |
| | CRI/SSBRI - 3 | RSRP/SINR - 3 | Flag - 3 |
| Report group 2 | CRI/SSBRI - 4 | RSRP/SINR - 4 | Flag - 4 |

| Index | RSRP |
|-------|------|
| Report group 0 | 1 | RSRP 0 |
| | 5 | RSRP 1 |
| Report group 1 | 4 | RSRP 2 |
| | 7 | RSRP 3 |

| | Index | RSRP |
|---|---|---|
| Report group 0 | 1 | RSRP 0 |
| | 1 | RSRP 1 |
| Report group 1 | 3 | RSRP 2 |
| | 3 | RSRP 3 |

| Index | RSRP |
|-------|------|
| Report group 0 | 0 1 | RSRP 0 |
| | 1 1 | RSRP 1 |
| Report group 1 | 0 3 | RSRP 2 |
| | 1 3 | RSRP 3 |

| | Index | RSRP |
|---|---|---|
| Report group 0 | 1 | RSRP 0 |
| | | RSRP 1 |
| Report group 1 | 4 | RSRP 2 |
| | | RSRP 3 |

| Pairs/RS | {CMR#1 CMR#5} | {CMR#1 CMR#6} | {CMR#2 CMR#7} | {CMR#4 CMR#7} | CMR#1 | CMR#4 |
|----------|---------------|---------------|---------------|---------------|-------|-------|
| index | 1 | 2 | 3 | 4 | 5 | 6 |

| | Index | RSRP |
|---|---|---|
| Report group 0 | 1 | RSRP 0 |
| | | RSRP 1 |
| Report group 1 | 4 | RSRP 2 |
| | | RSRP 3 |
| Report RS | 5 | RSRP 4 |

| RS (pair) | {CMR#1 CMR#5} | {CMR#1 CMR#6} | {CMR#2 CMR#7} | {CMR#4 CMR#7} | CMR#1 | CMR#4 |
|-----------|---------------|---------------|---------------|---------------|-------|-------|
| result | RSRP 0 | RSRP 1 | RSRP 2 | RSRP 3 | RSRP 4 | RSRP 5 |

Receive configuration including at least one CMR  252

Perform measurement of at least one CMR  254

Send a report  256

SYSTEMS AND METHODS FOR ENHANCING CHANNEL MEASUREMENT AND BEAM MANAGEMENT

CROSS-REFERENCE TO RELATED APPLICATION

This application claims the benefit of priority under 35 U.S.C. § 120 as a continuation of PCT Patent Application No. PCT/CN2021/084348, filed on Mar. 31, 2021, the disclosure of which is incorporated herein by reference in its entirety.

TECHNICAL FIELD

The disclosure relates generally to wireless communications, including but not limited to systems and methods for channel measurement and beam management.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a configuration from a wireless communication node, the configuration including at least one channel measurement reference signal (RS) resource (CMR). The wireless communication device may perform, according to the configuration, measurement of the at least one CMR. The wireless communication device may send a report to the wireless communication node. The report may include at least one of: a CMR index, or a channel quality.

In some embodiments, the channel quality may comprise at least one of: reference signal received power (RSRP), signal-to-interference-plus-noise ratio (SINR), or channel quality information (CQI). In some embodiments, the wireless communication device may determine X sets of CMRs or X subsets of CMRs from a set of CMRs, according to the configuration. In some embodiments, X can be an integer greater than 1. In some embodiments, the wireless communication device may receive a message comprising a bitmap from the wireless communication node. In some embodiments, the wireless communication device may determine at least one set of CMRs from the X sets, according to the bitmap. In some embodiments, each of the X subsets may have a respective (1/X)-th of resources from the set of CMRs. In some embodiments, when there are M CMRs in the one resource set, every (k+n*X)-th of the CMRs may belong to the k-th one of the X subsets. In some embodiments, n may assume integer values that are at least zero and no greater than ((M/X)−1). In some embodiments, the wireless communication device may determine, according to the configuration, a mapping between a first group of CMRs and a second group of CMRs, each of the first and second groups corresponding to one of the X sets or subsets.

In some embodiments, the configuration may include a first bitmap to indicate at least one CMR pair includes a CMR from the first group and another CMR from the first or second group, wherein the CMR pair is used for determining a channel quality according to multiple CMRs. In some embodiments, the configuration may include a second bitmap to indicate at least one CMR from the first group and the second group to be used for determining a channel quality according to a single CMR. In some embodiments, CMRs not indicated by the first bitmap for pairing, may each be used for determining a channel quality according to a single CMR. In some embodiments, CMRs from the first group and the second group may each be used for determining a channel quality according to a single CMR. In some embodiments, a number of CMR pairs indicated by the first bitmap, may be configured according to a capability of the wireless communication device. In some embodiments, a number of CMRs indicated by the second bitmap, may be configured according to the capability of the wireless communication device. In some embodiments, a plurality of CMRs in a first group may be mapped with a respective CMR in a second group in order as CMR pairs for determining a channel quality according to multiple CMRs. In some embodiments, a number of the plurality of CMRs can be determined according to: a mapping parameter, or a number of CMRs in the first group and a number of CMRs in the second group.

In some embodiments, CMRs from the first and second groups that are each to be used for determining a channel quality according to a single CMR, may comprise: all CMRs in the first and second groups, at least one CMR in the first group or the second group that is unmapped according to the mapping parameter, or at least one CMR indicated by the second bitmap. In some embodiments, the wireless communication device may perform mapping of resources between the first group and the second group, according to a value of the mode parameter. In some embodiments, if the value of the mode parameter is a first value, the wireless communication device may perform mapping of CMRs between the first group and the second group, according to claim 11. In some embodiments, if the value of the mode parameter is a second value, the wireless communication device may perform mapping of CMRs between the first group and the second group, by: mapping every two CMRs from different groups, or mapping every two CMRs from different groups and from a same group.

In some embodiments, if multiple CMR pairs of resources share a common CMR, then other CMRs in the multiple CMR pairs may be configured with a same quasi co-location (QCL) Type-D or quasi co-located in QCL Type-D. In some embodiments, the report may include measurement information for use by the wireless communication node to configure a subsequent transmission. In some embodiments, the measurement information may be indicative of at least one of: a number of downlink or uplink layers, a number of sounding reference signal (SRS) ports, whether multiple CMRs are shared or received with a same panel of the wireless communication device, a panel identifier (ID) of the wireless communication device, or a case index. In some embodiments, case information may be predefined by the wireless communication node. In some embodiments, the case information may be reported by a capability of the wireless communication device. In some embodiments, in the report, the measurement information may include, in a first mode, information specific to each CMR in a report group. In some embodiments, in the report, the measurement information may include, in a second mode, information shared across all CMRs in a report group or shared across all report groups. In some embodiments, the wireless communication device may receive, from the wireless communication node according to a capability of the wireless communication device, a message to configure the wireless communication device to send the report according to the first mode or the second mode.

In some embodiments, the report may include a flag value indicative of whether a corresponding CMR in the report can be applied to uplink transmission. In some embodiments, if the flag value is set to a first value, the flag value may be indicative that the corresponding CMR can be applied to uplink transmission. In some embodiments, if the flag value is set to a second value, the flag value may be indicative that the corresponding CMR cannot be applied to uplink transmission. In some embodiments, if the flag value is set to a second value, the flag value may be indicative that the corresponding CMR can be applied to uplink transmission, if a scheduling time of subsequent uplink transmission is greater than a threshold, wherein the threshold is configurable according to a capability of the wireless communication device. In some embodiments, a first CMR of each report group in the report can be applied to uplink transmission. In some embodiments, first X CMRs of each report group, or all CMRs in a first Y report groups in the report can be applied to uplink transmission, where X and Y are positive integer values. In some embodiments, at least one of X or Y is configured via a radio resource control (RRC), medium access control control element (MAC CE) or other signaling. In some embodiments, the report may include a parameter to indicate a CMR with a maximum reference signal received power (RSRP) or signal-to-interference-plus-noise ratio (SINR) value.

In some embodiments, when a reported CMR can be applied to uplink transmission, a corresponding channel quality is determined by at least one of: downlink CMR transmission measurement, or uplink compensation after downlink CMR transmission measurement. In some embodiments, the CMR index may be determined by its global index as configured via higher layer signaling. In some embodiments, a CMR index reported first in a report group that is reported first among report groups in the report, may be determined by its global index. In some embodiments, each remaining CMR index may be determined by its local index within a corresponding group of CMRs. In some embodiments, first CMRs in each report group can be from a first group of CMRs, and second CMRs in each report group can be from a second group of CMRs. In some embodiments, a CMR index with a largest measured reference signal received power (RSRP) or signal-to-interference-plus-noise ratio (SINR) may be reported first in a report group that is reported first among report groups in the report. In some embodiments, each CMR index may be determined by a group index of its corresponding group of CMRs, and by its local index within the corresponding group of CMRs.

In some embodiments, in the report, indices of CMRs that are used for determining channel quality according to multiple CMRs may be determined by a corresponding CMR pair index. In some embodiments, in the report, an index of a CMR that is used for determining channel quality according to a single CMR may be determined by a value that is unique from CMR pair indices. In some embodiments, the wireless communication device may send N reports comprising N measurements with best channel quality among all CMR pairs and single CMRs. In some embodiments, the wireless communication device may send N reports comprising A measurements with best channel quality among all CMR pairs, and B measurements with best channel quality among all single CMRs, where A and B are each a positive integer value, and A+B=N. In some embodiments, the report may include a signal-to-interference-plus-noise ratio (SINR) determined according to a signal from antenna elements corresponding to all receiver branches. In some embodiments, each of the receiver branches may be associated with at least one of a panel identifier (ID) or a CMR pair ID. In some embodiments, the report may include a value of signal-to-interference-plus-noise ratio (SINR) or channel quality indicator (CQI). In some embodiments, the value may be determined according to a first CMR. In some embodiments, noise or interference corresponding to the value may be determined according to one or more second CMRs configured in a same CMR pair of the first CMR. In some embodiments, the noise or interference may be further determined according to one or more dedicated interference measurement (IM) resources. In some embodiments, the one or more dedicated IM resources may be associated with the first CMR. In some embodiments, the one or more dedicated IM resources may be associated with the CMR pair or associated with the first CMR or the one or more second CMRs configured in the same CMR pair.

At least one aspect is directed to a system, method, apparatus, or a computer-readable medium. A wireless communication node may send a configuration to a wireless communication device. The configuration may include at least one channel measurement reference signal (RS) resource (CMR). The wireless communication device may perform measurement of the at least one CMR, according to the configuration. The wireless communication node may receive a report from the wireless communication device. The report may include at least one of: a CMR index, or channel quality.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 3-5 illustrate example approaches for determining CMR pairs from one or more CMR groups, in accordance with some embodiments of the present disclosure;

FIG. 6 illustrates example approaches for indicating a CMR pair, in accordance with some embodiments of the present disclosure;

FIG. 7 illustrates example approaches for indicating a STRP measurement, in accordance with some embodiments of the present disclosure;

FIGS. 9-10 illustrate example approaches for reporting information, in accordance with some embodiments of the present disclosure;

FIG. 11 illustrates example configurations for flag values, in accordance with some embodiments of the present disclosure;

FIGS. 13-16 illustrate example approaches for determining CMR indices, in accordance with some embodiments of the present disclosure;

FIGS. 17-18 illustrate examples approaches for coding the CMR pairs used for MTRP measurements and the CMR used for STRP measurements together, in accordance with some embodiments of the present disclosure;

FIG. 19 illustrates example approaches for organizing measurement results of the wireless communication device in descending order, in accordance with some embodiments of the present disclosure.

DETAILED DESCRIPTION

1. Mobile Communication Technology and Environment

Figure 1:
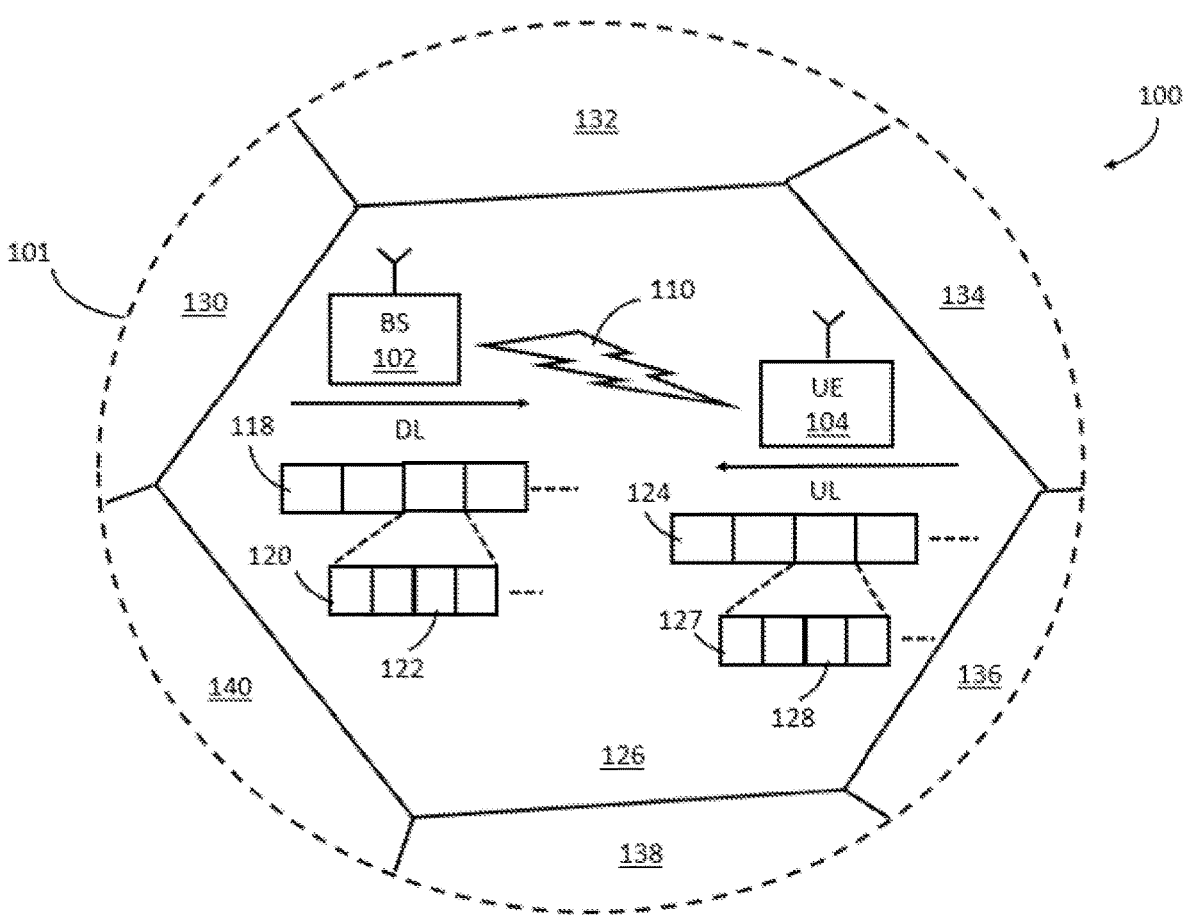
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
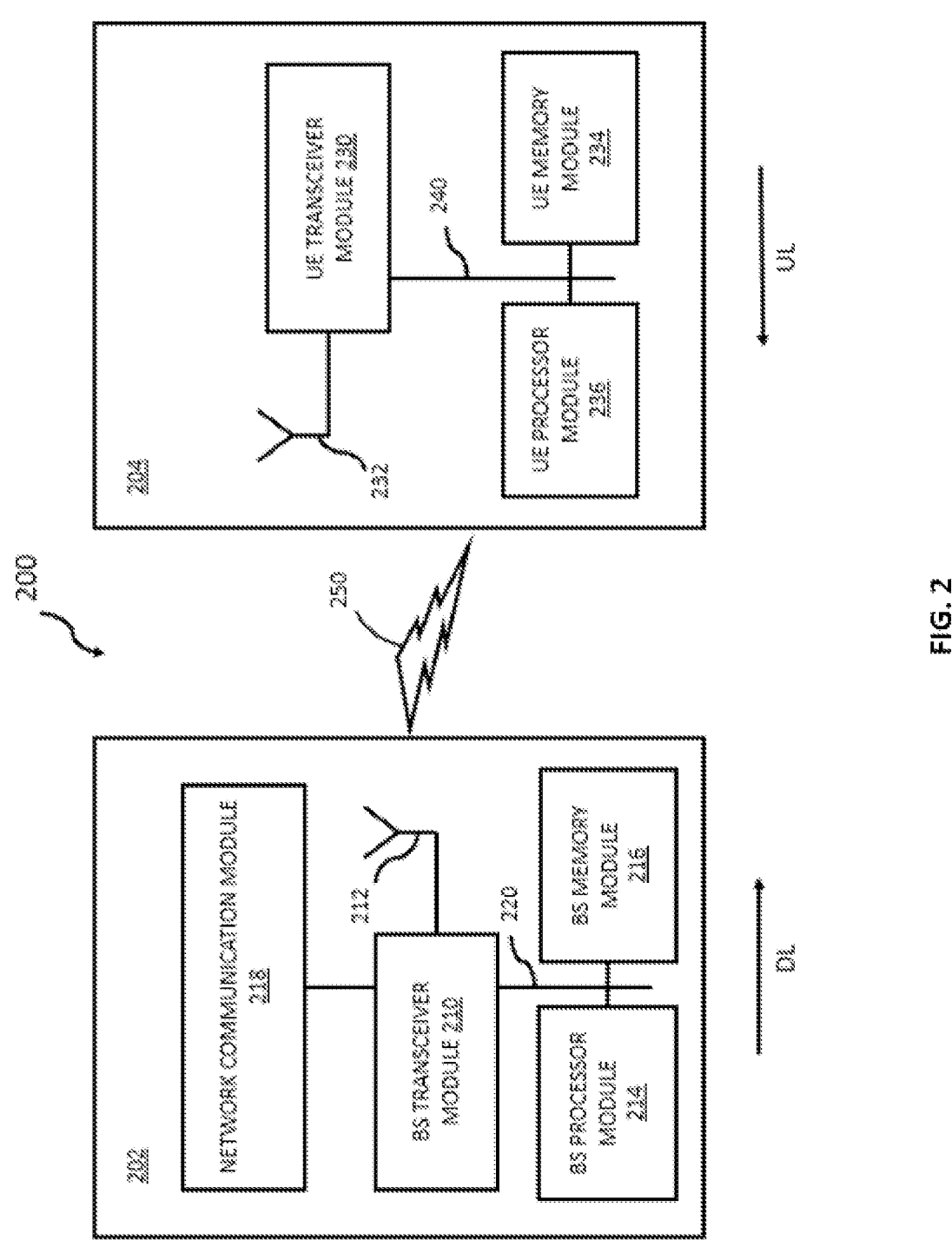
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Channel Measurement and Beam Management

In certain systems (e.g., 5G new radio (NR), next generation (NG) systems, and/or other systems), multiple transmission and reception points (MTRP) technology may improve/enhance coverage at the edge of a cell and/or reduce the negative impact of a blocking effect. With the standardization of MTRP technology, procedures/approaches to enhance downlink (DL) transmissions are gradually becoming stable. However, current procedures/approaches for enhancing uplink (UL) transmissions are far from stable. In certain scenarios, a wireless communication device (e.g., a UE, a terminal, and/or a served node) may have multi-panel transmission capability. If the wireless communication device has multi-panel transmission capability, solutions for channel state information (CSI) feedback and/or group-based reporting in beam management can be further assessed.

The systems and methods presented herein consider a multi-panel simultaneous transmission capability of the wireless communication device. In addition, the systems and methods include one or more grouping/pairing approaches for measurement reference signals (RSs) on the side of the wireless communication node (e.g., a central processing unit (CPU), a ground terminal, a base station, a gNB, an eNB, a transmission-reception point (TRP), a network (NW), or a serving node), as well as a report format at the wireless communication device side (e.g., after receiving an indication). Specifically, one or more of the following issues/problems can be considered.

The wireless communication node may indicate/specify/inform/report (e.g., to the wireless communication device) the measurement resources used for single transmission and reception point (STRP) transmissions, the measurement resources used for MTRP transmissions, and/or the resources that need to be received by the wireless communication device at the same time. The wireless communication device may report/inform/provide the measurement information after receiving/obtaining an instruction from the wireless communication node. For example, the measurement information may include measurement resource indexes, measurement results, and/or other information.

A MTRP approach can use multiple transmission and reception points (TRPs) to effectively improve/enhance the throughput of transmissions in certain systems (e.g., Long Term Evolution (LTE), Long Term Evolution-Advanced (LTE-A), and/or new radio access technology (NR) in an enhanced mobile broadband (eMBB) scenario). Using MTRP transmissions and/or receptions can effectively reduce/decrease the probability of information blockage, and/or improve/enhance the reliability of transmissions in certain scenarios (e.g., ultra-reliability and low latency communication (URLLC) scenarios).

According to (or based on) the mapping/relationship/association between a transmitted signal flow and a multi-TRP/panel, multiple coordinated points of transmission/reception can be divided/categorized/organized/classified into at least two types. The at least two types can include coherent transmissions and/or non-related transmissions.

For coherent transmissions, each data layer can be mapped to a multi-TRP/panel through weighted vectors. However, coherent transmissions may have higher/stricter requirements for synchronization between TRPs and/or for the transmission capability of backhaul links. Furthermore, coherent transmissions can have increased sensitivity to a plurality of non-ideal factors.

Non-coherent joint transmissions (NCJT) may be less affected by (or susceptible to) the above factors. Therefore, NCJT may be used in certain systems (e.g., R15) to coordinate multiple points of transmission/reception. In NCJT, each data flow can be mapped/related to a port. The port may correspond to the TRP/panel with same channel large-scale parameters (QCL). In some embodiments, different/separate/distinct data flows can be mapped to different ports with different large-scale parameters. All TRPs may not be processed as a virtual array.

Figure 3:
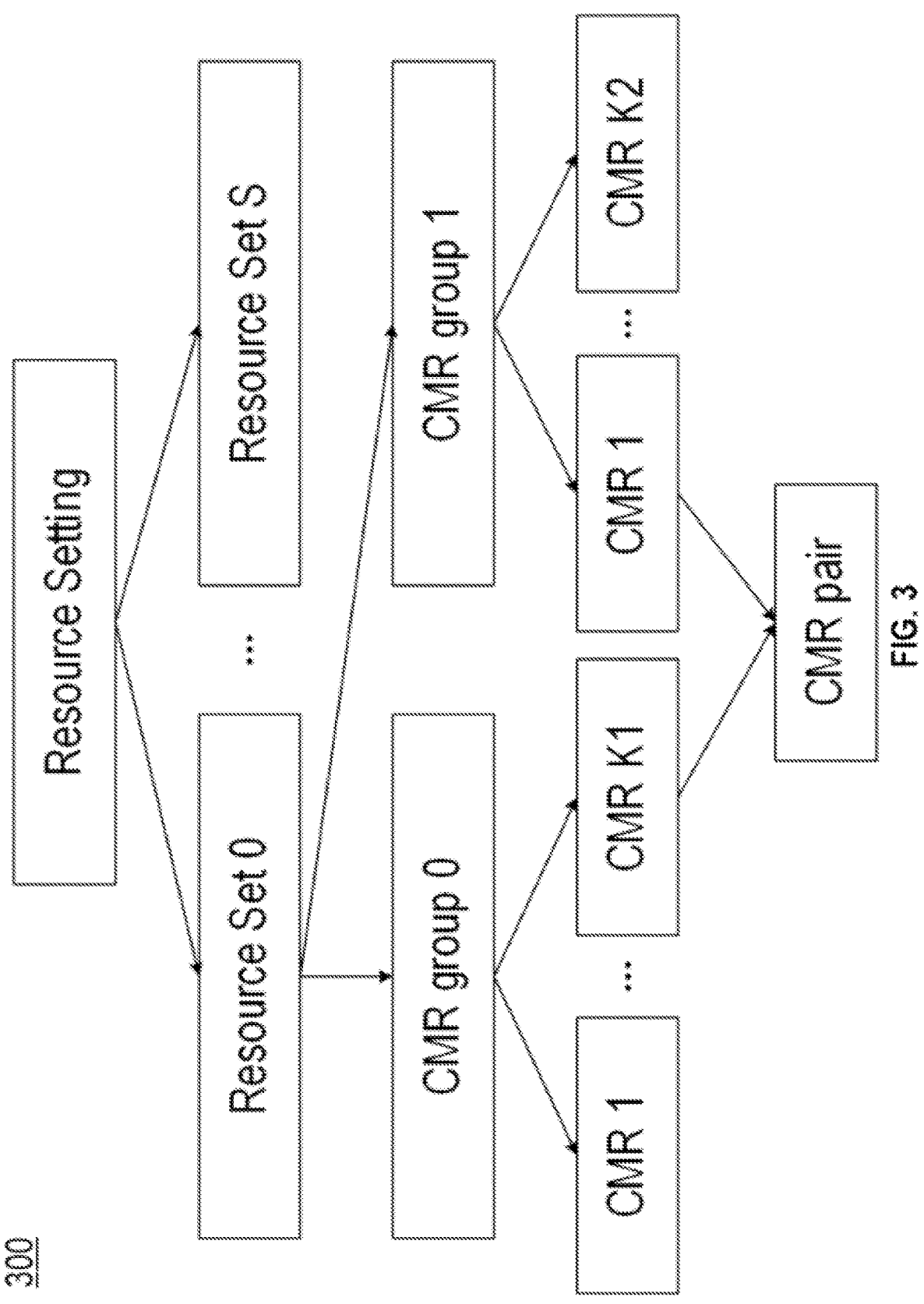

In certain systems (e.g., Rel-17), one or more rules for CSI reporting in a MTRP scenario can be defined/configured. For CSI measurements associated/related to a reporting setting (e.g., CSI-ReportConfig and/or other settings) for NCJT, the wireless communication device can be configured with $Ks \geq 2$ non-zero-power (NZP) CSI reference signal (CSI-RS) resources in a CSI-RS resource set for a channel measurement resource (CMR), and/or $N \geq 1$ NZP CSI-RS resource pairs. Each pair may be used for a NCJT measurement hypothesis. The wireless communication device can be configured with at least two CMR groups with $Ks=K1+K2$ CMRs. CMR pairs may be determined from the at least two CMR groups by following a detailed configuration method (as illustrated in FIG. 3).

For beam measurements in a plurality of simultaneous MTRP transmissions, the wireless communication device may report/specify/indicate a single CSI report. The CSI report may include N beams pairs/groups and/or M ($M>1$) beams per pair/group. Different/separate/distinct beams within a pair/group can be received/obtained simultaneously.

In some embodiments, a beam may correspond/refer to a quasi-co-location (QCL) state, a transmission configuration indicator (TCI) state, a spatial relation state (or spatial relation information state), a reference signal (RS), a spatial filter, and/or pre-coding. Specifically:

a) A transmit (Tx) beam may correspond/refer to a QCL state, a TCI state, a spatial relation state, a DL/UL reference signal (e.g., channel state information reference signal (CSI-RS), synchronization signal block (SSB) (also called SS/PBCH), demodulation reference signal (DMRS), sounding reference signal (SRS), and/or physical random access channel (PRACH)), a Tx spatial filter, and/or Tx precoding.

b) A receive (Rx) beam may correspond/refer to a QCL state, a TCI state, a spatial relation state, a spatial filter, a Rx spatial filter, and/or Rx precoding.

c) A beam identifier (ID) may correspond/refer to a QCL state index, a TCI state index, a spatial relation state index, a reference signal index, a spatial filter index, a precoding index, and/or other indices.

In some embodiments, the spatial filter may correspond to the perspective of the wireless communication device and/or the wireless communication node. In some embodiments, the spatial filter may refer to a spatial-domain filter and/or other filters. In some embodiments, a spatial relation information may comprise one or more reference RSs. The spatial relation information may be used to specify/indicate/convey/represent the spatial relation between a targeted RS/channel and the one or more reference RSs. In some embodiments, a spatial relation may refer to same/quasi-co beam(s), same/quasi-co spatial parameter(s), and/or same/quasi-co spatial filter(s). In some embodiments, a spatial relation may include or correspond to a beam, spatial parameter, and/or spatial domain filter.

In some embodiments, a QCL state may comprise one or more reference RSs and/or one or more corresponding QCL type parameters. The QCL type parameters may include at least one of: a Doppler spread, a Doppler shift, a delay spread, an average delay, an average gain, and/or a spatial parameter (e.g., a spatial Rx parameter). In some embodiments, a TCI state may correspond/refer to a QCL state. In some embodiments, a QCL Type A may include a Doppler shift, a Doppler spread, an average delay, and/or a delay spread. In some embodiments, a QCL Type B may include a Doppler shift and/or Doppler spread. In some embodiments, a QCL Type C may include a Doppler shift and/or an average delay. In some embodiments, a QCL Type D may include a spatial Rx parameter.

In some embodiments, an UL signal may include/comprise a PRACH, a physical uplink control channel (PUCCH), a physical uplink shared channel (PUSCH), an UL DMRS, a SRS, and/or other channels/signals. In some embodiments, a DL signal may include/comprise a physical downlink control channel (PDCCH), a physical downlink shared channel (PDSCH), a SSB, a DL DMRS, a CSI-RS, and/or other channels/signals. In some embodiments, group based reporting may comprise at least one of beam group based reporting and/or antenna group based reporting. In some embodiments, a beam group may specify that different/separate/distinct Tx beams within one group can be simultaneously received and/or transmitted. A beam group may indicate that Tx beams between different groups may not be simultaneously received and/or transmitted. In some embodiments, a beam group can be described from the perspective of the wireless communication device.

In some embodiments, a CMR may indicate/provide/specify a channel measurement signal/resource. The signal/resource may include or correspond to a CSI-RS, a SS/PBCH block, and/or other signals/resources. In some embodiments, an IMR may specify/indicate an interference measurement (IM) signal/resource. The signal/resource may include or correspond to a CSI-RS, CSI-IM, and/or other signals/resources. In some embodiments, a panel ID may include or correspond to a UE panel index.

I. Embodiment 1

In some embodiments, the wireless communication device may send/transmit/communicate the report to the wireless communication node according to (or based on) at least one CMR. The at least one CMR can be configured by a wireless communication node. In some embodiments, the report may include:

A CMR index, such as:
One or more indices of CSI-RS, a SS/PBCH block, and/or other signals/resources (e.g., a SRS).
Channel quality information, such as:
a reference signal received power (RSRP).
a signal-to-interference-plus-noise ratio (SINR).
channel quality information (CQI).
In some embodiments, the parameters to be reported may depend on a higher-layer configuration.

II. Embodiment 2

In some embodiments, the wireless communication device may measure/assess the channel according to (or based on) a CMR in the configured CMR resource set. To enhance/improve certain approaches that use NCJT, one or more of the following schemes/options can be considered:
Configure N CMR resource sets for the wireless communication device (e.g., N≥2). Each resource set (or each resource group) may be associated/related with a wireless communication node (e.g., TRP).
The number of resources in different/separate/distinct resource sets may be the same or different.
Divide/categorize/classify/organize a resource set into N resource subsets (e.g., N≥2).
Option 1: In some embodiments, M resources may be configured in a resource set. When M resources are configured in a resource set, the first M/N resources belong to (or are included in) the first subset. The second M/N resources belong to (or are a part of) the second subset. Therefore, the $j^{th}$ M/N resources belong to the $j^{th}$ sub set.
Option 2: In some embodiments, M resources may be configured in a resource set. When there are M CMRs in the one resource set, every (k+n*X)-th of the CMRs belongs to (or is a part of) the k-th one of the X subsets. In some embodiments, n may assume integer values that are at least zero and/or no greater than ((M/X)−1). For example, M=6 (or other values) resources can be configured in a resource set. If M=6 resources are configured, the resource set may be divided into N=3 resource subsets. The first resource subset may include resources 1 and 4, while the second resource subset can include resources 2 and 5. The third resource subset may include resources 3 and 6.
In some embodiments, more than one CMR set may be configured (e.g., aperiodic CSI resource setting). If more than one CMR set is configured, one bitmap can be used to indicate/specify two or more sets from all configured sets, corresponding to multiple TRPs.
In current specifications, for aperiodic CSI resource setting, the number of configured CSI-RS resource sets can be S>1. For example, if S=4, one bit map can be used to select two of the four configured sets (set), corresponding to two TRPs respectively.

III. Embodiment 3

For a CSI report in the NCJT scenario, the CMR resources that the wireless communication node instructs the wireless communication device to receive (independently and/or simultaneously, as a resource pair, for instance) are discussed herein. Based on the description of Embodiment 2, a group may include or correspond to the above resource set and/or resource subset.
Rule 1: A mapping between group 0 (e.g., a first group) and group 1 (e.g., a second group) may be performed/configured according to (or based on) a bitmap. The wireless communication node may send/transmit/communicate information of the mapping to the wireless communication device.
1.1: In some embodiments, only one bitmap may be used to indicate the pairing/mapping.
1.1.1: CMR pairs may be determined from (or according to) at least two CMR groups (e.g., group 0 and group 1). FIG. 4 depicts an example approach 400 for determining CMR pairs from two CMR groups. If the bitmap is set/configured to "1" (e.g., CMR3 and CMR1), the corresponding CMR pair can be used for MTRP measurements (e.g., for determining a channel quality according to multiple CMRs in the CMR pair). If the CMR is set/configured to "0", the CMR can be used for STRP measurements (e.g., for determining a channel quality according to a single CMR). In some embodiments, all resources in group 0 and/or group 1 can be used for STRP measurements.

1.1.2: CMR pairs can be determined from (or according to) only one CMR group (e.g., group 0 or group 1). FIG. 5 depicts an example approach 500 for determining CMR pairs from one CMR group and/or from two CMR groups. If the bitmap is set/configured to "1", the corresponding CMR pair can be used for MTRP measurements (e.g., for determining a channel quality according to multiple CMRs in the CMR pair). If the CMR is set/configured to "0", the CMR can be used for STRP measurements (e.g., for determining a channel quality according to a single CMR). In some embodiments, all resources in group 0 and/or group 1 can be used for STRP measurements.

1.2: In some embodiments, two bitmaps may be used to indicate/specify/configure a pairing and/or a STRP measurement respectively.

In some embodiments, the two bitmaps may not be limited to the two bitmaps, but two parts of one bitmap.

FIG. 6 depicts an example approach 600 for indicating a CMR pair. If the bitmap is set/configured to "1", the corresponding CMR pair can be used for MTRP measurements.

FIG. 7 depicts an example approach 700 for indicating a STRP measurement. If the bitmap is set/configured to "1", the corresponding CMR can be used for STRP measurements.

The number of CMR pairs (or CMRs) indicated/specified by the wireless communication node and/or the number of single CMR used for STRP measurements (e.g., the number of 1's in the bitmap(s)) may depend on (or be configured according to) the capability of the wireless communication device.

Rule 2: A mapping of a first group (e.g., group 0) and a second group (e.g., group 1) in a predetermined order.

2.1: Configured by (or according to) the wireless communication node.

Group 0 may have M CMRs (e.g., CMR #1, CMR #2, CMR #M), while group 1 may have N CMRs (e.g., CMR #1, CMR #2, CMR #N). A parameter S (e.g., S=0.5, 1, 2, . . . ) can be configured by the wireless communication node. A plurality of CMRs in the first group can be mapped/associated/related with a respective CMR in the second group in order (e.g., as CMR pairs for MTRP measurements). The parameter S can specify/indicate the number of CMRs in the first group to be mapped with a CMR in the second group.

For example, if S=2, CMR #1 and #2 from group 0 can be mapped to CMR #1 in group 1 as CMR pairs, such as {CMR #1 (group 0), CMR #1 (group 1)} and { CMR #2 (group 0), CMR #1 (group 1)}. Furthermore, CMR #3 and #4 from group 0 can be mapped to CMR #2 in group 1 as CMR pairs, such as{CMR #3 (group 0), CMR #2 (group 1)} and {CMR #4 (group 0), CMR #2 (group 1)}.

If M/N>2, the CMRs that can be used for STRP measurements may be as follows:

Option 1: the remaining CMRs in group 0 (e.g., if M=3 and N=1, one CMR remains in group 0)

Option 2: all CMRs (e.g., groups 0 and/or 1)

Option 3: CMRs indicated by a bitmap (e.g., see 1.2: STRP measurement indication).

If M/N<2, the CMRs that can be used for STRP measurements may be as follows:

Option 1: the remaining CMRs in group 1 (or other groups)

Option 2: all CMRs (e.g., groups 0 and/or 1)

Option 3: CMRs indicated by a bitmap (e.g., see 1.2: STRP measurement indication)

If M/N=2, the CMRs that may be used for STRP measurements may be as follows:

Option 2: all CMRs (e.g., groups 0 and/or 1)

Option 3: CMRs indicated by a bitmap (e.g., see 1.2: STRP measurement indication)

2.2: Using a predefined mapping (e.g., the wireless communication node may not configure the mapping information)

The wireless communication device may determine/configure the matching/mapping relationship in accordance with (or based on) the number of CMRs configured in different/separate groups by the wireless communication node. For instance, the wireless communication device may determine a respective number of CMRs in the first group to be mapped with a respective CMR in the second group as CMR pairs, in accordance with a number of CMRs configured in the first group and a number of CMRs configured in the second group by the wireless communication node.

For example, group 0 may have M CMRs (e.g., CMR #1, CMR #2, CMR #M), while group 1 can have N CMRs (e.g., CMR #1, CMR #2, CMR #N). If M/N=2, CMR #1 and CMR #2 in group 0 can be mapped to CMR #1 in group 1. Furthermore, CMR #3 and CMR #4 in group 0 may be mapped to CMR #2 in group 1. If M/N=1, CMR #1 in group 0 may be mapped to CMR #1 in group 1. Furthermore, CMR #2 in group 0 may be mapped to CMR #2 in group 1.

2.3: Certain embodiments may use/include a match mode (and/or a mode parameter). For instance, the wireless communication device may receive a mode parameter from the wireless communication node (e.g., according to a capability of the wireless communication device).

Mode 1: A mode parameter can be configured, according to (or by using) higher layer signaling (e.g., radio resource control (RRC) and/or medium access control control element (MAC-CE) signaling), as a first value (e.g., "enable" and/or "on"). If the mode parameter is configured as the first value, a pairing may be performed/executed in accordance with the systems and methods of 2.1 and/or 2.2.

Mode 2: The mode parameter can be configured, according to higher layer signaling (e.g., RRC and/or MAC-CE signaling), as a second value (e.g., "disable" and/or "off"). If the mode parameter is configured as the second value, every two CMRs in two CMR groups may be paired. For example, group 0 may have CMR #1 and/or CMR #2, while group 1 may have CMR #3 and/or CMR #4. The configured/assembled CMR pairs may include:

Option 1: CMR pairs from the two CMR groups (e.g., different groups). For instance, {CMR #1, CMR #3} {CMR #2, CMR #3} {CMR #1, CMR #4} { CMR #2, CMR #4}.

Option 2: CMR pairs from at least one of the two (e.g., a same) CMR groups (e.g., from one or two CMR groups). For instance, {CMR #1, CMR #3} {CMR #2, CMR #3} {CMR #1, CMR #4} {CMR #2, CMR #4} and {CMR #1, CMR #2} {CMR #3, CMR #4}.

If a plurality of CMR pairs share a common CMR, then other CMRs in the plurality of CMR pairs should be configured with a same quasi co-location (QCL) Type-D or quasi co-located in QCL Type-D.

For example, the CMR pairs may include {CMR #1, CMR #3} {CMR #2, CMR #3}, wherein CMR #3 is common between the pairs. Therefore, the other CMRs (e.g., CMR #1 and/or CMR #2) may be configured with a same/corresponding QCL Type-D and/or QCLed with QCL-Type-D.

IV. Embodiment 4

In some embodiments, the wireless communication device may receive/obtain the measurement reference signal from the wireless communication node. The aspects of a report from the wireless communication device are discussed herein.

2.1: Reported Content

In some embodiments, the wireless communication device may receive the M=2 CSI-RS and/or SSB resources simultaneously. The M=2 CSI-RS and/or SSB resources may be received with a single spatial domain receive filter and/or with multiple simultaneous spatial domain receive filters.

Figure 8B:
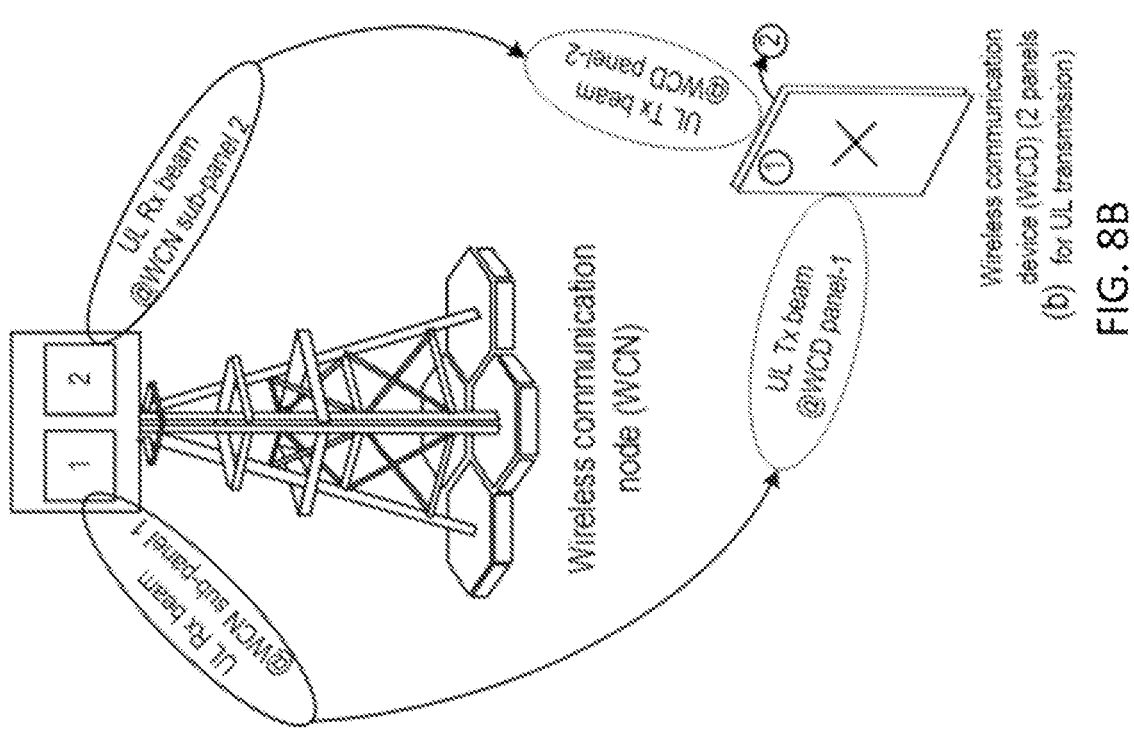
FIGS. 8A-8B illustrate example approaches for receiving resources simultaneously, in accordance with some embodiments of the present disclosure.
Figure 8A:
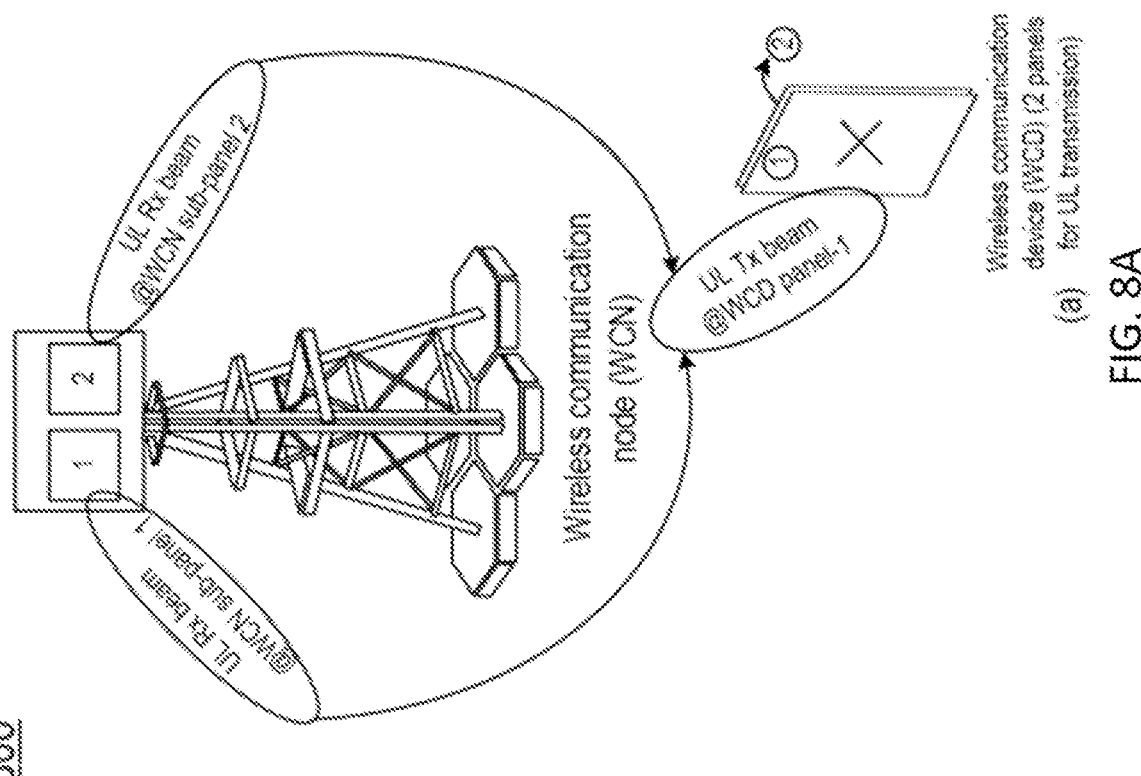

For a single spatial domain receive filter, the M=2 CSI-RS and/or SSB resources can be used for spatial diversity, as shown in FIG. 8A.

For multiple simultaneous spatial domain receive filters, the M=2 CSI-RS and/or SSB resources can be used for spatial multiplexing, as shown in FIG. 8B.

2.1.1: In some embodiments, a mapping between a CSI-RS/SSB to be reported and measurement of the wireless communication device may be considered. The following information can be reported in a group based reporting and/or UE capability.

Mode 1: The report may include measurement information, wherein the measurement information can include information specific to each CMR in a report group (e.g., RI per CSI-RS/SSB in a group). FIG. 9 depicts an example approach 900 for reporting information in the first mode (e.g., Mode 1).

Mode 2: The report may include measurement information, wherein the measurement information can include information shared across all CMRs in a report group and/or shared across all report groups. For instance, a RI per group and/or RI may be shared with all groups. When a RI is shared across all CMRs in a report group, the RI can be equally split/divided/partitioned into N parts that are mapped to N CMRs respectively.

FIG. 10 depicts an example approach 1000 for reporting information in the second mode (e.g., mode 2).

In some embodiments, the wireless communication node may configure the modes (e.g., mode 1 and/or mode 2), according to (or based on) a capability of the wireless communication device. The wireless communication device may receive/obtain a message from the wireless communication node. The message can be used to configure the wireless communication device to send/communicate/transmit the report according to the first mode and/or the second mode.

The measurement information may indicate/specify a number of downlink or uplink layers (e.g., {1, 2, 3, 4, . . . }), a number of SRS ports (e.g., {1, 2, 3, 4, . . . }), a flag that indicates whether multiple CMRs are shared or received with a same panel of the wireless communication device, a panel ID used by the wireless communication device to receive the CMRs, and/or a case index (e.g., case-x).

In some embodiments, each case may be a combination of one or more of the above parameters. For instance, Case-1 may correspond to {2-DL-layer, 1 SRS port, panel 2}, Case-2 may correspond to {2-DL-layer, 2 SRS ports, panel 1}, and so on. The wireless communication device may report the index of the case, according to the measurements. The case information can be predefined/preconfigured by the wireless communication node, and/or reported by the capability of the wireless communication device (e.g., in order to save/reduce reporting overhead).

In some embodiments, candidate values of the measurement information can be reported/indicated/specified by the wireless communication device.

2.1.2: To enable/configure separate reporting for uplink (UL) and downlink (DL) transmissions, a rule or flag can be used to indicate/specify which RS can be used for an UL transmission (e.g., subsequent UL transmission). A flag value can be indicative of whether a corresponding CMR in the report can be applied to uplink transmission.

Case 1: A flag value may be set/configured as first value. If the flag value is set to a first value, the flag value may indicate that the corresponding CMR can be applied to uplink transmission. If the CMR can be applied to an uplink transmission, the spatial relation of the uplink transmission can be determined according to the CMR. In some embodiments, the flag value may be set/configured as the second value. If the flag value is set to the second value, the flag value may indicate that the corresponding CMR cannot be applied to uplink transmission. FIG. 11 depicts an example configuration 1100 of flag values.

Case 2: In some embodiments, a first CMR of each report group in the report can be applied to uplink transmission. For instance, the first CSI-RS and/or SSBRI in each report group can be used for UL transmissions. An additional parameter can be used to indicate/provide/specify a maximum RSRP/SINR.

Case 3: In some embodiments, first X CMRs of each report group, and/or all CMRs in a first Y report groups can be applied to uplink transmission. For example, the first X CSI-RS/SSB(s) in a report group, and/or the first Y report group(s) can be applied to UL transmissions. In some embodiments, X and/or Y can be positive integer values. In certain embodiments, X and/or Y can be configured by using higher layer signaling (e.g., RRC signaling and/or MAC-CE signaling). In another example, X and/or Y can be reported in the report instance.

When a CMR cannot be applied to uplink transmission reported by wireless communication device, there may be at least two possible options/modes/configurations.

Mode 1: The CMR cannot be applied to uplink transmission.

The wireless communication device may be unable to determine the spatial relation of an uplink transmission according to the CMR.

Figure 12:
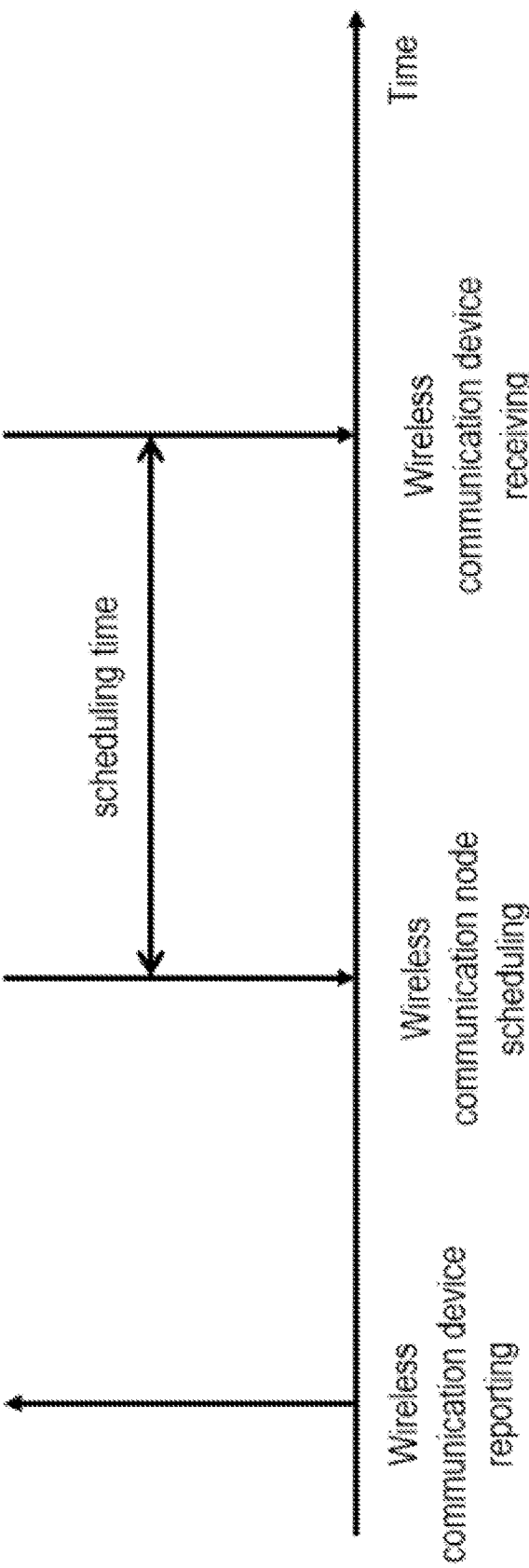
FIG. 12 illustrates example configurations of a scheduling time, in accordance with some embodiments of the present disclosure.

Mode 2: The CMR can be used to determine the spatial relation of uplink transmission. However, a scheduling time of the subsequent uplink transmission may be greater than a threshold. For instance, a corresponding beam may require a longer delay than other corresponding beams that reported can be applied to UL transmissions. Therefore, the scheduling time (e.g., the wireless communication node schedules a wireless communication device through downlink control information (DCI) to receive signals) should be greater than the threshold. The threshold may be configurable according to (or based on) a capability of the wireless communication device. FIG. 12 depicts an example configuration 1200 of a scheduling time.

The RSRP/SINR of a reported CMR applied to uplink transmission may be determined according to:

Option 1: The measurement result can be reported directly according to downlink CMRs (e.g., DL CMR transmission measurement).

Option 2: The measurement result can be reported after uplink compensation, which is equivalent to the measurement result from the wireless communication node side during UL transmission.

V. Embodiment 5

Embodiment 3 considers the determination of the content reported by the wireless communication device. In this section, an index of the reporting reference signals is discussed.

For example, the CMRs configured by higher layer signaling (e.g., RRC signaling) may include group 0 {CMR #1 CMR #2 CMR #4} and/or group 1 {CMR #5 CMR #6 CMR #7}. The wireless communication node may indicate the CMR pairs include {CMR #1 CMR #5}, {CMR #1 CMR #6}, {CMR #2 CMR #7}, and/or {CMR #4 CMR #7}. After performing a measurement, the wireless communication device may report/specify/indicate pairs {CMR #1 CMR #5} and/or {CMR #4 CMR #7}.

Option 1: The CMR index may be determined by its global index as configured via higher layer signaling (e.g., global index+global index, global index+global index). In some embodiments, all reported RS indices may use global indices, which are the same as those configured by the higher layer. FIG. 13 depicts an example approach 1300 for determining a CMR index.

Based on the descriptions of differential reporting in current systems/methods, the differential L1-RSRP/L1-SINR value can be computed with 2 dB step size with a reference to the largest measured L1-RSRP/L1-SINR value. Therefore, the first CMR index reported in the first group should be the CMR with the best (e.g., maximum) RSRP/SINR.

Option 2: The CMR index reported first in a report group that is reported first among report groups in the report, can be determined by its global index. Each remaining CMR index can be determined by its local index within a corresponding group of CMRs (e.g., global index+local index, local index+local index). The local indices may include or correspond to the relative indices in the higher layer configuration group(s). FIG. 14 depicts an example approach 1400 for determining a CMR index. The first CMR index reported in the first group using global index should be the CMR with the best (e.g., maximum) RSRP/SINR.

Option 3: Each CMR index can be divided/partitioned into at least two parts (e.g., configuration group index+local index). A first part may include or correspond to the configuration group index. A second part may include or correspond to an intra-group relative index. FIG. 15 depicts an example approach 1500 for determining a CMR index.

Option 4: The wireless communication device may report/specify/indicate a CMR pair index. FIG. 16 depicts an example approach 1600 for determining a CMR index.

If the wireless communication device is required to perform MTRP and/or STRP measurements at the same time, code the CMR pairs used for MTRP measurements and the CMR used for STRP measurements together. For example, {CMR #1 CMR #5}, {CMR #1 CMR #6}, {CMR #2 CMR #7}, and/or {CMR #4 CMR #7} can be used for MTRP measurements. CMR #1 and/or CMR #4 can be used for STRP measurements. The wireless communication device may report/specify {CMR #1 CMR #5}, {CMR #4 CMR #7}, and CMR #1. FIGS. 17-18 depict example approaches for coding the CMR pairs used for MTRP measurements and the CMR used for STRP measurements together.

VI. Embodiment 6

For beam measurements in MTRP simultaneous transmissions, a single CSI report can be supported/used. The single CSI report may include N (e.g., N=1 and/or N=2) beams pairs/groups and/or M (e.g., M>1) beams per pair/group. Different/separate beams within a pair/group can be received simultaneously. When the wireless communication device is configured with reference signals to measure MTRP and STRP transmissions (e.g., at the same time) and/or N is required to be greater than 1, the following modes can be considered (e.g., according to an indication of the wireless communication node and/or a capability of the wireless communication device).

Mode 1: The wireless communication device may report/specify/indicate N optimal (e.g., best out of all pairs or singles) CMR (pair) indices and/or the corresponding channel quality (e.g., RSRP, SINR, and/or CSI) in all measurement results. Therefore, a CMR index with a largest measured RSRP and/or SINR may be reported first in a report group that is reported first among report groups in the report. For example, the CMRs configured by higher layer signaling may include group 0 {CMR #1 CMR #2 CMR #4} and/or group 1 {CMR #5 CMR #6 CMR #7}. The CMR pairs configured for MTRP measurements may include or correspond to {CMR #1 CMR #5}, {CMR #1 CMR #6}, {CMR #2 CMR #7}, and/or {CMR #4 CMR #7}. The CMRs configured for STRP measurements may include or correspond to CMR #1 and/or CMR #4. The wireless communication device may report/specify {CMR #1 CMR #5}, {CMR #4 CMR #7}, and/or CMR #1. The measurement results of the wireless communication device can be sorted/organized in descending order as, indicated in FIG. 19. If an N value of 1 (e.g., N=1) is indicated, the wireless communication device can report {CMR #1 CMR #5} with RSRP 0. In another example, if an N value of 1 (e.g., N=1) is indicated, the wireless communication device can report {CMR #1 CMR #5} with RSRP 0 and/or {CMR #1 CMR #6} with RSRP 1.

Mode 2: The wireless communication device may report an optimal CMR (pair) indices and/or the corresponding channel quality (e.g., RSRP, SINR, and/or CSI) in all MTRP measurement results. The wireless communication device may report/specify B optimal CMR indices and/or the corresponding channel quality (e.g., RSRP, SINR, and/or CSI) in all STRP measurement results. Where, A+B=N. The values of A and/or B can be configured by the wireless communication node and/or determined by the capability of the wireless communication device. For example, the CMRs configured by higher layer signaling may include group 0 {CMR #1 CMR #2 CMR #4} and/or group 1 {CMR #5 CMR #6 CMR #7}. The CMR pairs configured for MTRP measurements may include or correspond to {CMR #1 CMR #5}, {CMR #1 CMR #6}, {CMR #2 CMR #7}, and/or {CMR #4 CMR #7}. The CMRs configured for STRP measurements may include or correspond to CMR #1 and/or CMR #4. When A=1 and B=0 (e.g., N=1) are indicated, the wireless communication device may report/specify/indicate {CMR #1 CMR #5} with RSRP 0. When A=1 and B=1 (e.g., N=2) are indicated, the wireless communication device may report/specify/indicate {CMR #1 CMR #5} with RSRP 0 and/or and CMR #1 with RSRP 4.

VI. Embodiment 7

The L1-RSRP based beam management in R15 may not be an optimal solution, as it only considers the signal strength rather than the interference. The L1-SINR based downlink beam management mechanism is introduced in R16 to include the interference information of each beam. However, the relevant specification has not been modified accordingly, and therefore, further details need to be standardized.

A. 5.1 Combined SINR

For group based reporting, one SINR can be calculated/determined for each beam at the side of the wireless communication device (e.g., in accordance with current specifications). However, to reflect the mutual interference between beams, one SINR value may be reported/provided. The SINR can reflect the interference of a wireless communication device when it receives and/or transmits signals by using multiple beams at the same time. Therefore, the receiver branch is further described herein. A receiver branch may be associated with at least one of a panel identifier (ID) and/or or a CMR pair ID. In some embodiments, a reported SINR value can be determined based on (or according to) the signal from antenna elements corresponding to all given receiver branches.

B. 5.2 Resource Setting

For group based reporting, the signal power can be determined according to a first CMR. The noise and/or interference corresponding to the signal may be determined according to one or more second CMRs/IM resources. The second CMRs can be configured in a same CMR pair of the first CMR. The interference measurement (IM) resource can be associated with the first CMR, with the CMR pair including the first CMR, and/or with a first/second CMR configured in the same CMR pair. Therefore, current specifications may require further description.

For example,

When two Resource Settings are configured, IM resources may be associated with the measurement pair or SSB/NZP CSI-RS resource for channel measurements in the same measurement pair.

When one Resource Setting is configured, CMRs for interference measurements may be configured in the same measurement pair of the SSB or NZP CSI-RS resource for channel measurement.

C. 5.3 Interference Measurement Resource Configuration

For group based reporting, the CSI-IM resource configuration may be specific to one SSB and/or NZP CSI-RS resource pair. Therefore, the RSs in the two resource settings may not be a one-to-one correspondence, and the quantity may not be the same. Therefore, current specifications need to be further described as follows:

For example, when two Resource Settings are configured, each SSB or NZP CSI-RS resource (or SSB/NZP CSI-RS resource pair) for channel measurement is associated with one CSI-IM resource or one NZP CSI-RS resource for interference measurement by the ordering of the SSB or NZP CSI-RS resource (or SSB/NZP CSI-RS resource pair) for channel measurement and CSI-IM resource or NZP CSI-RS resource for interference measurement in the corresponding resource sets.

VIII. Channel Measurement and Beam Management

Figure 20:
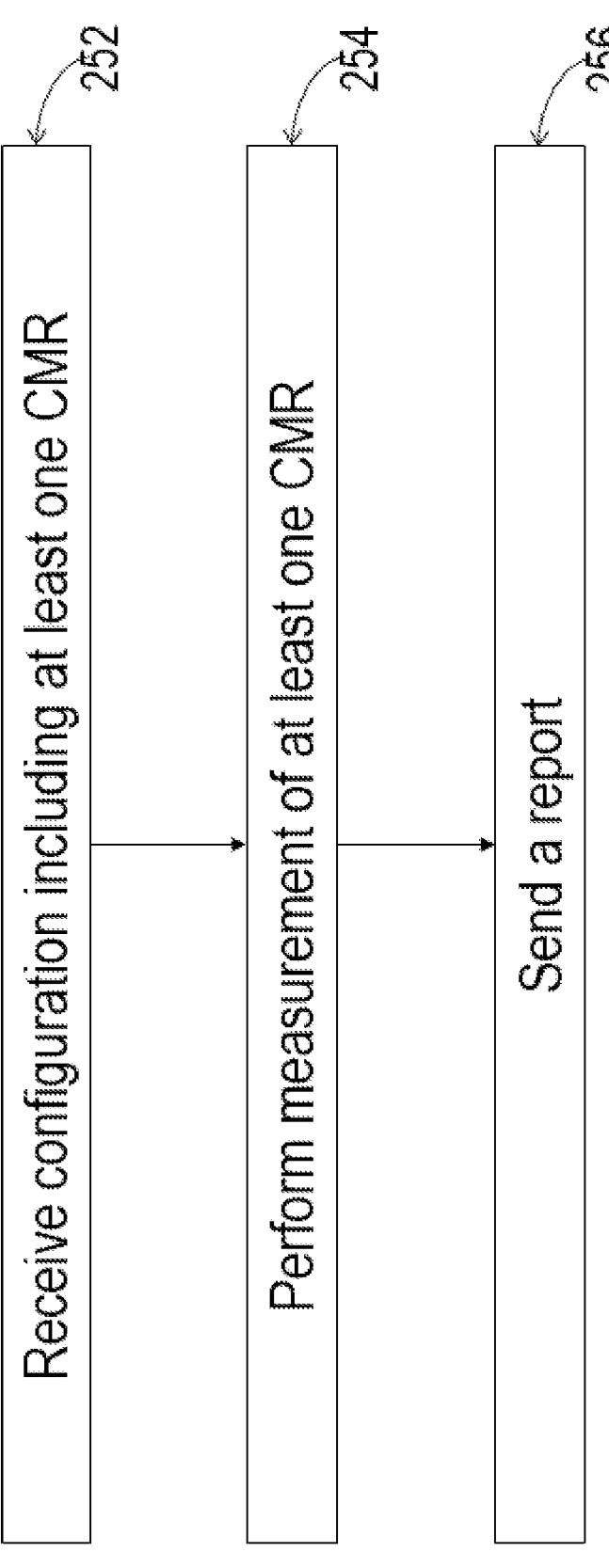
FIG. 20 illustrates a flow diagram of an example method for channel measurement and beam management, in accordance with an embodiment of the present disclosure.

FIG. 20 illustrates a flow diagram of a method 2050 for channel measurement and beam management. The method 2050 may be implemented using any of the components and devices detailed herein in conjunction with FIGS. 1-19. In overview, the method 2050 may include receiving a configuration including at least one CMR (252). The method 2050 may include performing measurement of the at least one CMR (254). The method 2050 may include sending a report (256).

Referring now to operation (252), and in some embodiments, a wireless communication device (e.g., a UE) may receive/obtain/acquire a configuration from a wireless communication node (e.g., gNB). The wireless communication node may send/transmit/broadcast/communicate the configuration to the wireless communication device. The configuration may include at least one channel measurement reference signal (RS) resource (CMR) and/or other information. For instance, the configuration may include/provide/specify/indicate at least one CMR and/or reporting instructions. In some embodiments, the wireless communication device may determine/configure/identify X sets of CMRs and/or X subsets of CMRs from a set of CMRs. The wireless communication device may determine the X sets and/or X subsets according to (or based on) the configuration. The parameter/number X may be an integer greater than 1 (or other values). In some embodiments, the wireless communication device may receive/obtain a message comprising a bitmap from the wireless communication node. In some embodiments, the wireless communication device may determine at least one set of CMRs from the X sets. The wireless communication device may determine the at least one set of CMRs according to the bitmap. In some embodiments, each of the X subsets may have a respective/corresponding (1/X)-th of resources from the set of CMRs. For example, the resources from the set can be split/organized/divided/partitioned into X portions. Each portion of the X portions may be for each subset. The portion can include or correspond to 1/X of the resources. In some embodiments, the one resource set may include M CMRs. When there are M CMRs in the one resource set, every (k+n*X)-th of the CMRs may belong to (or be associated/related with) the k-th one of the X subsets. In some embodiments, n may assume integer values that are at least zero and/or no greater than ((M/X)−1).

In some embodiments, the wireless communication device may determine/identify/configure a mapping. The wireless communication device may determine the mapping according to (or based on) the configuration. The mapping may include or correspond to a mapping between a first group of CMRs and a second group of CMRs. Each of the first and second groups may correspond to (or be associated with) one of the X sets and/or subsets. In some embodiments, the configuration may include/provide/specify/indicate a first bitmap. The first bitmap may provide/indicate at least one CMR pair. The CMR pair may include a CMR from the first group and another CMR from the first and/or second group. The CMR pair can be used for determining/measuring a channel quality according to (or based on) multiple CMRs (e.g., MTRP measurements). In some embodiments, the configuration may include/specify a second bitmap (e.g., for single TRP transmissions and/or measurements). The second bitmap may be used to indicate/specify/provide at least one CMR from the first group and/or the second group. The at least one CMR from the first group and/or the second group can be used to determine/measure/identify a channel quality according to (or based on) a single CMR. For instance, if a resource in the second bitmap is set/configured as "1" (or other values), the resource can be used for STRP measurements. In some embodiments, CMRs may not be indicated/specified by the first bitmap for pairing. The CMRs not indicated by the first bitmap for pairing can each be used for determining a channel quality according to (or based on) a single CMR. For instance, if a resource in the first bitmap is set/configured as "0" (or other values), the resource can be used for STRP measurements. In some embodiments, CMRs from the first group and/or the second group may each be used for determining/measuring/identifying a channel quality. For example, all resources can be used for STRP measurements. The channel quality may be determined according to (or by using) a single CMR.

In some embodiments, the first bitmap may indicate/specify/provide a number of CMR pairs (e.g., for MTRP measurements). The number of CMR pairs may be configured according to (or based on) a capability of the wireless communication device. In some embodiments, the second bitmap may indicate/specify/provide a number of CMRs (e.g., for STRP measurements). The number of CMRS may be configured according to (or based on) the capability of the wireless communication device. In some embodiments, a plurality of CMRs in a first group can be mapped with a respective CMR in a second group in order as CMR pairs for determining a channel quality according to (or based on) multiple CMRs. In some embodiments, a number of the plurality of CMRs can be determined according to (or based on) a mapping parameter and/or a number of CMRs in the first group and a number of CMRs in the second group. In some embodiments, CMRs from the first and second groups may each be used for determining/measuring/assessing a channel quality according to (or by using) a single CMR. The CMRs (e.g., from the first and second group) that are each to be used for determining a channel quality may comprise all CMRs in the first and second groups. The CMRs (e.g., from the first and second group) that are each to be used for determining a channel quality may comprise at least one CMR in the first group and/or the second group. The at least one CMR may be unmapped according to (or based on) the mapping parameter. The CMRs (e.g., from the first and second group) that are each to be used for determining a channel quality may comprise at least one CMR indicated/provided/specified by the second bitmap.

In some embodiments, the wireless communication device may determine/configure a respective number of CMRs in the first group. The respective number of CMRs (e.g., in the first group) may be mapped/associated/related with a respective CMR in the second group as CMR pairs. The wireless communication device may determine the respective number of CMRs to be mapped in accordance with a number of CMRs configured in the first group. The wireless communication device may determine the respective number of CMRs to be mapped in accordance with a number of CMRs configured in the second group by the wireless communication node. In some embodiments, the wireless communication device may receive/obtain a mode parameter from the wireless communication node. The wireless communication device may receive the mode parameter via higher layer signaling (e.g., RRC signaling and/or MAC-CE signaling). The wireless communication device may receive the mode parameter according to (or based on) a capability of the wireless communication device. In some embodiments, the wireless communication device may perform mapping/association of resources between the first group and/or the second group. The wireless communication device may perform the mapping according to (or based on) a value of the mode parameter. In some embodiments, the value of the mode parameter may include or correspond to a first value (e.g., mode 1, "enable", and/or "on"). If the value of the mode parameter is the first value, the wireless communication device may perform mapping of CMRs between the first group and/or the second group, according to (or based on) claim 11. For instance, the wireless communication device may perform mapping of CMRs by determining the respective/corresponding number of CMRs in the first group to be mapped with the respective/corresponding CMR in the second group as CMR pairs.

In some embodiments, the value of the mode parameter may include or correspond to a second value (e.g., mode 2, "disable", and/or "off"). If the value of the mode parameter is the second value, the wireless communication device may perform/execute mapping of CMRs between the first group and/or the second group. The wireless communication device may perform the mapping of CMRs by mapping/associating every two (or other values) CMRs from different/separate/distinct groups. The wireless communication device may perform the mapping of CMRs by mapping/associating every two (or other values) CMRs from different/separate/distinct groups and/or from a same/corresponding group. In some embodiments, multiple CMR pairs of resources may share/use a common CMR. If multiple CMR pairs of resources share a common CMR, other CMRs in the multiple CMR pairs may be configured with a same quasi co-location (QCL) Type-D and/or quasi co-located in QCL Type-D.

Referring now to operation (254), and in some embodiments, the wireless communication device may perform/execute/conduct measurement of the at least one CMR. The wireless communication device may perform the measurement according to (or based on) the configuration. In some embodiments, a CMR index with a largest measured reference signal received power (RSRP) and/or signal-to-interference-plus-noise ratio (SINR) may be reported/specified/provided first in a report group that is reported first among report groups in a report. In some embodiments, each CMR index may be determined/configured by a group index of its corresponding group of CMRs (e.g., configured via higher layer signaling, such as RRC signaling and/or MAC-CE signaling). In some embodiments, each CMR index may be determined/configured by its local index within the corresponding group of CMRs. In some embodiments, the wireless communication device may send/transmit/communicate/broadcast N reports. The N reports may comprise N measurements with best channel quality among all CMR pairs and/or single CMRs. The N reports may comprise A measurements with best channel quality among all CMR pairs. The N reports may comprise/include B measurements with best channel quality among all single CMRs. The parameters/numbers/values A and B can each be a positive integer value, and A+B=N.

Referring now to operation (256), and in some embodiments, the wireless communication device may send/transmit/communicate a report/description. Responsive to the sending of the report, the wireless communication node may receive/obtain the report. The report may include/provide/specify/indicate at least one of: a CMR index, channel quality, and/or other information. In some embodiments, the channel quality may comprise at least one of: reference signal received power (RSRP), signal-to-interference-plus-noise ratio (SINR), and/or channel quality information (CQI). In some embodiments, the report may include/provide/specify measurement information (or other information). The measurement information may be for use by the wireless communication node to configure a subsequent/following transmission. The measurement information may include/indicate/provide at least one of: a number of downlink or uplink layers, a number of sounding reference signal (SRS) ports, a panel identifier (ID) of the wireless communication device, and/or a case index. In some embodiments, all possible combinations can be pre-configured by the wireless communication node and/or reported via the capability of the wireless communication device. If the wireless communication device reports/informs/provides the measurement results, only the case index may be reported (e.g., via the report). The measurement information may specify/indicate whether multiple CMRs are shared and/or received/obtained with a same panel of the wireless communication device. If multiple CMRs are shared and/or received with a same panel of the wireless communication device, a group may include up to two layers. If multiple CMRs are not shared and/or received with a same panel of the wireless communication device, a group may include up to four layers. In some embodiments, case information (e.g., corresponding to (or associated with) the case index) may be predefined/preconfigured by the wireless communication node. The case information may be reported/communicated by a capability of the wireless communication device.

In some embodiments, the measurement information in the report may include information specific to each CMR in a report group, in a first mode. In some embodiments, the measurement information in the report may include information shared across all CMRs in a report group (e.g., RI per group), in a second mode. In some embodiments, the measurement information in the report may include information shared across all report groups (e.g., RI is shared with all groups), in the second mode. In some embodiments, the wireless communication device may receive/obtain a message from the wireless communication node. The wireless communication device may receive the message according to (or based on) a capability of the wireless communication device (or other information). The message can be used to configure the wireless communication device to send/transmit/communicate the report (e.g., get the CMR pairs) according to (or based on) the first mode and/or the second mode. In some embodiments, the report may include/provide/specify a flag value. The flag value may indicate whether a corresponding CMR in the report can be applied to uplink transmission. For instance, the flag value may include or correspond to a first value and/or a second value. If the flag value is set/configured to the first value, the corresponding CMR in the report can be applied to uplink transmission. If the flag value is set/configured to the second value, the corresponding CMR in the report may not be applied to uplink transmission. In another example, if the flag value is set/configured to the second value, the corresponding CMR can be applied to uplink transmission. The corresponding CMR can be applied to uplink transmission if a scheduling time of subsequent uplink transmission is greater than a threshold. The threshold may be configurable according to (or based on) the capability of the wireless communication device.

In some embodiments, a first CMR (or other CMR) of each report group in the report can be applied to uplink transmission. In some embodiments, the wireless communication node can use first X CMRs of each report group to configure a subsequent uplink transmission. In some embodiments, the wireless communication node can use all CMRs in a first Y report groups in the report to configure a subsequent uplink transmission. The parameters X and/or Y may be positive integer values. In some embodiments, radio resource control (RRC), medium access control control element (MAC CE) and/or other signaling may be used to configure at least one of X or Y. In some embodiments, the report may include a parameter. The parameter may indicate/specify/provide a CMR with a maximum reference signal received power (RSRP) and/or signal-to-interference-plus-noise ratio (SINR) value. In some embodiments, a reported CMR can be applied to uplink transmission. A corresponding channel quality may be determined/measured/assessed by (or according to) at least one of: downlink CMR transmission measurement, and/or uplink compensation after downlink CMR transmission measurement. In some embodiments, the CMR index may be determined by (or according to) its global index as configured via higher layer signaling (e.g., RRC and/or MAC-CE signaling). In some embodiments, a CMR index may be reported/provided/specified first in a report group that is reported first among report groups in the report. The CMR index may be determined/configured by its global index. Each remaining CMR index can be determined/configured by its local index within a corresponding group (e.g., first and/or second group configured by the wireless communication node) of CMRs. In some embodiments, first CMRs in each report group may be from a first group of CMRs. Second CMRs in each report group can be from a second group of CMRs.

In the report, indices of CMRs that are used for determining/measuring/acquiring channel quality according to (or based on) multiple CMRs may be determined/identified by a corresponding CMR pair index. In the report, an index of a CMR that is used for determining/measuring/acquiring/assessing channel quality according to (or by using) a single CMR can be determined/identified by a value that is unique from CMR pair indices. In some embodiments, the report may include/provide/specify/indicate a signal-to-interference-plus-noise ratio (SINR). The SINR may be determined according to (or based on) a signal from antenna elements corresponding to all receiver branches. Each of the receiver branches may be associated/related with at least one of a panel identifier (ID) and/or a CMR pair ID. In some embodiments, the report may include/provide/specify/indicate a value of signal-to-interference-plus-noise ratio (SINR) and/or channel quality indicator (CQI). The value may be determined according to (or based on) a first CMR. In some embodiments, noise or interference corresponding to the value may be determined/measured/identified according to (or based on) one or more second CMRs. The one or more second CMRs may be configured in a same CMR pair of the first CMR. In some embodiments, the noise and/or interference can be further determined/assessed according to (or based on) one or more dedicated interference measurement (IM) resources. The one or more dedicated IM resources may be associated/related with the first CMR. The one or more dedicated IM resources may be associated/related with the CMR pair including the first CMR. In some embodiments, the one or more dedicated IM resources may be associated with one or more second CMRs. The one or more second CMRs may be configured in the same CMR pair with the first CMR.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
receiving, by a wireless communication device from a wireless communication node, a configuration including two or more channel measurement reference signal (RS) resources (CMRs);
determining, by the wireless communication device according to the configuration, X sets of CMRs, where X is an integer greater than 1;
determining, by the wireless communication device according to the configuration, a mapping between a first group of CMRs and a second group of CMRs, each of the first and second groups corresponding to one of the X sets;
performing, by the wireless communication device according to the configuration, measurement of the two or more CMRs; and
sending, by the wireless communication device to the wireless communication node, a report including CMR indexes for a plurality of report groups, the CMR indexes including a first CMR index for at least one CMR from the first group and a second CMR index for at least one CMR from the second group,
wherein the first CMR index for the first group, which is reported first from the plurality of report groups in the report, is determined by its global index, and
each remaining CMR index is determined by its local index within the first group.

2. The method of claim 1, wherein the report further includes a channel quality, and the channel quality comprises:
reference signal received power (RSRP).

3. The method of claim 1, comprising performing, by the wireless communication device, the mapping of CMRs between the first group of CMRs and the second group of CMRs, according to a value of a mode parameter.

4. The method of claim 3, wherein if the mode parameter is configured with the value, the performing, by the wireless communication device, mapping of CMRs between the first group and the second group, comprises:
mapping every two CMRs from different groups.

5. The method of claim 1, wherein:
the report includes a parameter to indicate a CMR with a maximum reference signal received power (RSRP).

6. The method of claim 1, wherein:
first CMRs in each report group are from a first group of CMRs, and second CMRs in each report group are from a second group of CMRs.

7. The method of claim 1, wherein:
a CMR index with a largest measured reference signal received power (RSRP) is reported first in a report group that is reported first among report groups in the report.

8. The method of claim 1, wherein the report includes a parameter to indicate a CMR with a maximum reference signal received power (RSRP), and wherein the global index corresponding to the first CMR index corresponds to the CMR having the maximum RSRP, and each remaining CMR index is determined based on its local index within a corresponding group of CMRs.

9. The method of claim 1, wherein, for a group-based reporting, the report further includes measurement information reported according to a measurement information mode, the measurement information mode is selected from at least one of:
a first mode in which the measurement information includes information specific to each CMR in a report group, and
a second mode in which the measurement information includes information shared across all CMRs in a report group or shared across all report groups.

10. A method comprising:
sending, by a wireless communication node to a wireless communication device, a configuration including two or more channel measurement reference signal (RS) resources (CMRs), wherein the wireless communication device performs measurement of the two or more CMRs, according to the configuration,
wherein sending the configuration causes the wireless communication device to:
determine, according to the configuration, X sets of CMRs, where X is an integer greater than 1;
determine, according to the configuration, a mapping between a first group of CMRs and a second group of CMRs, each of the first and second groups corresponding to one of the X sets; and
perform, according to the configuration, measurement of the two or more CMRs; and
receiving, by the wireless communication node from the wireless communication device, a report including CMR indexes for a plurality of report groups, the CMR indexes including a first CMR index for at least one CMR from the first group and a at least one second CMR index from the second group,
wherein the first CMR index for the first group, which is reported first from the plurality of report groups in the report, is determined by its global index, and each remaining CMR index is determined by its local index within the first group.

11. The method of claim 10, wherein the report further includes a channel quality, and the channel quality comprises:
reference signal received power (RSRP).

12. The method of claim 10, wherein the configuration causes the wireless communication device to perform the mapping of CMRs between a first group of CMRs and a second group of CMRs, according to a value of a mode parameter.

13. The method of claim 12, wherein if the mode parameter is configured with the value, the wireless communication device maps the CMRs by mapping every two CMRs from different groups.

14. The method of claim 10, wherein:

the report includes a parameter to indicate a CMR with a maximum reference signal received power (RSRP).

15. A wireless communication device, comprising:

at least one processor configured to:

receive, via a transceiver from a wireless communication node, a configuration including two or more channel measurement reference signal (RS) resources (CMRs);

determine, according to the configuration, X sets of CMRs, wherein X is an integer greater than 1;

determine, according to the configuration, a mapping between a first group of CMRs and a second group of CMRs, each of the first and second groups corresponding to one of the X sets;

perform, according to the configuration, measurement of the two or more CMRs; and send, via the transceiver to the wireless communication node, a report including CMR indexes for a plurality of report groups, the CMR indexes including a first CMR index for at least one CMR from the first group and a second CMR index from the second group, wherein the first CMR index for the first group, which is reported first from the plurality of report groups in the report, is determined by its global index, and each remaining CMR index is determined by its local index within the first group.

16. A wireless communication node, comprising:

at least one processor configured to:

send, via a transceiver to a wireless communication device, a configuration including two or more channel measurement reference signal (RS) resources (CMRs), wherein the wireless communication device performs measurement of the two or more CMRs, according to the configuration, wherein sending the configuration causes the wireless communication device to:

determine, according to the configuration, X sets of CMRs, where X is an integer greater than 1;

determine, according to the configuration, a mapping between a first group of CMRs and a second group of CMRs, each of the first and second groups corresponding to one of the X sets; and perform, according to the configuration, measurement of the two or more CMRs; and receive, via the transceiver from the wireless communication device, a report including CMR indexes for a plurality of report groups, the CMR indexes including a first CMR index for at least one CMR from the first group and a second CMR index from the second group, wherein the first CMR index for the first group, which is reported first from the plurality of report groups in the report, is determined by its global index, and each remaining CMR index is determined by its local index within the first group.

* * * * *